United States Patent [19]

Steinberg

[11] Patent Number: 4,591,137
[45] Date of Patent: May 27, 1986

[54] PROTECTIVE COVERING FOR THE PISTON OF A TELESCOPING SPRING ELEMENT

[75] Inventor: Klaus Steinberg, Mauern, Fed. Rep. of Germany

[73] Assignee: Bayerische Motoren Werke, AG, Fed. Rep. of Germany

[21] Appl. No.: 665,540

[22] Filed: Oct. 26, 1984

[30] Foreign Application Priority Data

Oct. 26, 1983 [DE] Fed. Rep. of Germany ....... 3338801

[51] Int. Cl.[4] .......................... F16F 1/00; F16L 11/00
[52] U.S. Cl. .................................... 267/182; 138/128; 428/36; 428/192
[58] Field of Search ............................ 174/10; 428/36; 138/128; 188/322.12; 267/182

[56] References Cited

U.S. PATENT DOCUMENTS 3,812,282  4/1974  Johansson ............................ 174/10

Primary Examiner—John E. Kittle
Assistant Examiner—James J. Seidleck
Attorney, Agent, or Firm—Craig and Burns

[57] ABSTRACT

A protective covering for the piston rod of a telescoping spring element which includes a gas pressure cylinder and a piston rod. For protecting the piston rod during painting of the motor vehicle, the gas pressure cylinder is surrounded with a protective covering of sponge rubber which surrounds in a fluid-tight manner the cylinder casing and a sealing disk arranged at the free end of the piston rod. For the rapid removal of the protective covering after the painting operation, it is provided with a radially projecting tearing extension which has at its two base edges one cross-sectional reduction each formed by a longitudinal groove. The protective covering is longitudinally divided by these cross-sectional reductions, when tearing the tearing extension radially outwardly or in the longitudinal direction of the gas pressure cylinder, so that as a result thereof the protective covering then only has to be pulled off the gas pressure cylinder.

15 Claims, 3 Drawing Figures

U.S. Patent May 27, 1986 4,591,137
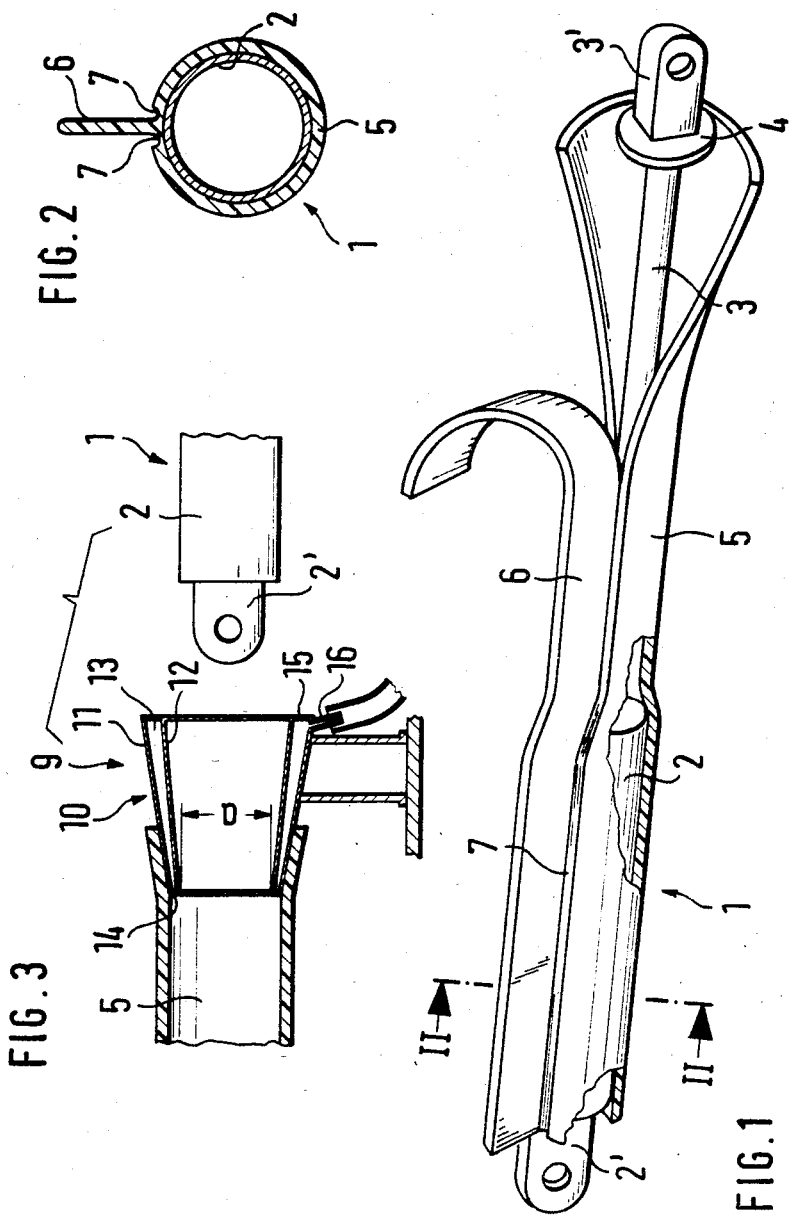

PROTECTIVE COVERING FOR THE PISTON OF A TELESCOPING SPRING ELEMENT

The present invention relates to a protective sheath or covering for the piston rod of a telescoping spring element of the type described in the German Offenlegungsschrift No. 19 02 019.

The known protective sheath covers the area of the piston rod projecting out of a telescoping vibration damper and serves both to protect the same against mechanical damage during use of the vibration damper as also during painting of the vehicle and vehicle parts from paint. In the last-mentioned case, the vibration damper does not have to be disassembled during the painting operation. Since, however, very high temperatures, namely up to about 180° C. occur during the drying of painted parts in the vehicle body, the protective sheath or covering must consist of a polymeric material resisting these high temperatures. Such a material is normally provided for the prior art protective sheath. However, since the prior art protective sheath is composed of two parts; namely, of a protective tube and of a protective tube support, it is not only complicated and has to be manufactured by means of expensive tools, but is also very time-consuming to install and above all to remove in relation to the useful effect obtained during the painting operation.

It is the object of the present invention to construct a protective sheath or covering of the aforementioned type in such a manner that it can be removed in a rapid and uncomplicated manner after painting the part carrying the telescoping spring element.

The underlying problems are solved according to the present invention in that the protective sheath or covering includes at least one essentially longitudinally extending intentional separating place, for example, in the form of a cross-sectional reduction.

If the protective sheath or covering includes only one longitudinally extending intentional separating place, i.e., extending between its free ends—which is formed by a cross-sectional reduction of the wall thickness of the protective sheath or covering—, the latter can be rapidly severed or divided after the painting by means of an auxiliary tool, if necessary, and thus the protective sheath or covering can be removed from the spring element in an uncomplicated manner. This can be further simplified if the protective sheath or covering has at least one radially projecting tearing extension extending over a partial section of its longitudinal extent which has at least one cross-sectional reduction in its transitional area to the outer circumference of the protective sheath or covering. The tearing extension is provided most appropriately with one cross-sectional reduction each within the area of its two base edges.

A protective sheath or covering made according to the extrusion method can be manufactured in a very price-favorable manner and has a constant cross-sectional profile as a result of which it can be readily installed with the use of a lubricant.

However, it is also possible within the scope of the present invention to slide the protective sheath or covering over the cylinder surface of the spring element by means of a special device. This device may consist of a conically shaped insertion funnel having a radial hollow space whereby the protective sheath or covering is adapted to be slipped externally over a section on the small, end face open diameter of the insertion funnel whose internal width at its smallest dimension is slightly larger than the outer dimension of the cylinder surface of the spring element whereas the end-face disposed at the large diameter of the insertion funnel is circumferentially closed and at least one radially projecting compressed air inlet is provided within the area thereof. During the introduction of compressed air into the hollow space of the insertion funnel and the exhaust thereof by way of the small diameter, the rubber-elastic protective sheath or covering is slightly expanded radially so that the cylinder surface of the spring element can be introduced into the protective sheath or covering which is provided appropriately as yard good, and the protective sheath or covering slightly contracts radially after interruption of the compressed air supply and therewith rests securely on the cylinder surface. Subsequently, the customarily endless yard good of the protective sheath can be separated off at the free end of the spring element in the extended condition of the latter.

In lieu of an intentional separating place, it is also possible to provide a protective sheath or covering for the intended purpose with a clipped seam so that it has a rectangular or square outer shape in the manufactured condition and for purposes of assembly its end sections near the seam only have to be joined and clipped together.

These and other objects, features and advantages of the present invention will become more apparent from the following description when taken in connection with the accompanying drawing which shows, for purposes of illustration only, one embodiment in accordance with the present invention, and wherein:

FIG. 1 is a perspective overall view of a gas pressure cylinder with a protective sheath or covering in accordance with the present invention surrounding the gas pressure cylinder, whose tearing extension is partially torn off;

FIG. 2 is a cross-sectional view, on an enlarged scale, taken along line II—II in FIG. 1; and FIG. 3 is a cross-sectional view of a device for slipping the protective sheath or covering over a gas pressure cylinder by means of compressed air in accordance with the present invention.

Referring now to the drawing wherein like reference numerals are used throughout the various views to designate like parts, the gas pressure cylinder generally designated by reference numeral 1 which is illustrated in FIG. 1, serves in the instant embodiment for pivoting a tiltable hood in a passenger motor vehicle and essentially consists of a cylinder casing 2 and of a piston rod 3 whereby a fastening eye 2', respectively, 3' is provided at the free end sections of cylinder casing 2 and piston rod 3. A sealing disk 4 surrounding the piston rod 3 thereby abuts at the fastening eye 3', and has the same outer diameter as the cylinder casing 2.

In order to protect the piston rod 3 against paint spray during the painting of the passenger motor vehicle—whereby the gas pressure cylinder 1 is installed—, the gas pressure cylinder 1 is surrounded by a protective sheath or covering 5 consisting of sponge-rubber, whereby the sponge-rubber is heat-resistant against temperatures of at least about 180° C. and is also resistant against the dipping baths used during the pretreatment for painting the passenger motor vehicle. This sponge rubber protective sheath or covering 5 is appropriately made according to the extrusion process as yard goods and thus has a constant cross-sectional profile over its entire length. A section is thereby cut to length from the yard good with such a dimension that the protective sheath or covering extends in the completely extended condition of the gas pressure cylinder 1 from the side of the free end of the cylinder casing 2 up to beyond the sealing disk 4. The sealing disk 4 as also the cylinder casing 2 is thereby surrounded in a fluid-tight manner by the protective sheath or covering 5 by means of the inherent or residual stress in the covering material.

In order that the protective sheath or covering 5 can be removed from the gas pressure cylinder 1 rapidly and without problems after the passenger motor vehicle or a vehicle part has been painted, it is provided with a radially projecting tearing extension 6 extending over the entire length dimension of the covering. The tearing extension 6 has one axially extending cross-sectional reduction 7 each at the two base edges located along the outer circumference of the protective sheath or covering 5; each cross-sectional reduction 7 is thereby formed by a longitudinal groove set back from the outer circumference (FIG. 2) and extending over the entire length of the protective sheath or covering 5, i.e., between the free ends thereof. Thus, for purposes of removing the protective sheath or covering 5 from the gas pressure cylinder 1, the tearing extension 6 only has to be torn with a very small force application radially outwardly or along the gas pressure cylinder 1 owing to the two provided cross-sectional reductions 7, whereby—as can be seen in FIG. 1 within the area of the free end of the piston rod 3—the protective sheath 5 is longitudinally divided or split and can thus be merely pulled off the gas pressure cylinder 1.

The protective sheath or covering 5 is slipped over the cylinder casing and the sealing disk 4 appropriately with the use of a paste-like lubricant. However, it is also possible to provide for that purpose the device generally designated by reference numeral 9 in FIG. 3. This device includes a fixedly arranged insert funnel generally designated by reference numeral 10 of conically truncated shape which is provided with an outer casing 11 and with an inner casing 12 provided at a radial distance thereto so that a radial hollow space 13 is formed. Openings are thereby provided at the end-face of the smaller diameter 14 extending circumferentially or sectionwise, whereas the end face of the insert funnel 10 located near the large diameter 15 is circumferentially closed. The small diameter 14, on the one hand, and the angle of inclination between the latter, and the large diameter 15, on the other, is so dimensioned that the protective sheath or covering 5 (as yard good) is adapted to be slipped over a section of about 10 to 20 mm. on the outer casing 11. Furthermore, the internal width d of the insert funnel 10 at the small diameter 14 is slightly larger than the outer diameter of the cylinder casing 2 of the gas pressure cylinder 1. Finally, at least one radially projecting pressure inlet 16 is provided within the area of the large diameter 15; however, it is also possible to provide therefor an annular nozzle. As mentioned above, for sliding the gas pressure cylinder 1 into the protective sheath or covering 5, the latter, as yard good, is slipped at its free end section over the outer casing 11 of the insert funnel 10 and thereafter compressed air is introduced into the insert funnel 10 by way of the compressed air inlet 16. The compressed air is finally blown out at the end face of the small diameter 14 and as a result thereof, the protective sheath or covering 5 is radially expanded over the largest part of its longitudinal dimension (as shown in FIG. 3) so that the cylinder casing 2 of the gas pressure cylinder 1 cna be inserted into the protective sheath 5 up to the sealing disk 4. After interruption of the compressed air supply, the protective sheath or covering 5 again contracts radially as a result of its inherent stress and elasticity and securely rests on the cylinder casing 2. Subsequently, the protective sheath or covering 5 (extending up to now as endless yard good) is pulled off the insert funnel 10 and is cut off behind the free end of the cylinder casing 2.

According to a non-illustrated embodiment, the insert funnel 10 may also be constructed split longitudinally whereby the two funnel halves are appropriately pivotally connected with one another near the small diameter 14 and, of course, include each at least one pressure inlet 15. Such an insert funnel 10 can be handled advantageously manually.

According to a still further non-illustrated embodiment, the protective sheath or covering 5 may consist of a rectangular or square sponge-rubber part which is rolled together and is provided at its mutually coordinated edges with a longitudinally extending fluid-tight clipping seam.

It is also assured by the sponge rubber provided for the protective sheath or covering 5 that the piston rod can be displaced longitudinally in the cylinder casing 2 of the gas pressure cylinder 1 whereby length changes can be absorbed for the most part by the protective sheath or covering 5 under formation of folds or the like.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A protective covering apparatus comprising the combination of
   a telescoping spring element and
   a protective covering for a piston rod of said telescoping spring element, the spring element having a cylinder casing, the protective covering consisting of polymeric material and surrounding, in a paint-tight manner, on the one hand, the cylinder casing of the spring element at least at its end section near the piston rod and, on the other, the free end section of the piston rod, the protective covering including further means forming at least one intentional separating place extending in the longitudinal direction.

2. A protective covering apparatus according to claim 1, wherein the further means is formed by at least one cross-sectional reduction.

3. A protective covering apparatus according to claim 1, wherein the spring element is a telescopic, vibration damper provided with a gas pressure cylinder forming the cylinder casing.

4. A protective covering apparatus according to claim 1, wherein the piston rod includes a sealing disk located at its fastening eye, said sealing disk being sealingly surrounded by one end of the high heat-resistant protective covering, the protective covering having a cross-sectional profile remaining substantially constant over its entire length and consisting of sponge-rubber-like material, the sealing disk and the cylinder casing of the spring element which have substantially the same outer dimension, being surrounded fluid-tight by the protective covering by means of its inherent stress.

5. A protective covering apparatus according to claim 4, wherein the protective covering includes at least one radially projecting tearing extension extending over at least a partial section of its longitudinal dimension, said tearing extension having at least one cross-sectional reduction within its transition area to the outer circumferential of the protective covering.

6. A protective covering apparatus according to claim 4, wherein the protective covering consists of sponge rubber and is made by extrusion process as yard goods.

7. A protective covering apparatus according to claim 4, wherein the protective covering is provided with a longitudinally extending fluid-tight clipping seam.

8. A protective covering apparatus according to claim 2, wherein the spring element is a telescopic, vibration damper provided with a gas pressure cylinder forming the cylinder casing.

9. A protective covering apparatus according to claim 8, wherein the piston rod includes a sealing disk located at its fastening eye, said sealing disk being sealingly surrounded by one end of the high heat-resistant protective covering, the protective covering having a cross-sectional profile remaining substantially constant over its entire length and consisting of sponge-rubber-like material, the sealing disk and the cylinder casing of the spring element which have substantially the same outer dimension, being surrounded fluid-tight by the protective covering by means of its inherent stress.

10. A protective covering apparatus according to claim 9, wherein the protective covering includes at least one radially projecting tearing extension extending over at least a partial section of its longitudinal dimension, said tearing extension having at least one cross-sectional reduction within its transition area to the outer circumference of the protective covering.

11. A protective covering apparatus according to claim 8, wherein the protective covering consists of sponge rubber and is made by extrusion process as yard goods.

12. A protective covering apparatus according to claim 8, wherein the protective covering is provided with a longitudinally extending fluid-tight clipping seam.

13. A protective covering apparatus according to claim 1, wherein the protective covering consists of sponge rubber and is made by extrusion process as yard good.

14. In combination,
a telescopic spring element and
a protective cover for a piston rod of said telescopic spring element, the protective cover consisting of a polymeric material and being a pipe that is closed on all sides and, on the one hand, in a paint-tight manner, surrounding a cylinder jacket of the spring element at least at an end section thereof that is proximate the piston rod and, on the other hand, surrounding the free end section of the piston rod, wherein the protective cover surrounds the cylinder jacket and the piston rod with internal stress and has at least one desired point of break extending essentially in longitudinal direction which is formed by a reduction of the cross-section of the pipe wall.

15. The combination according to claim 14, wherein the piston rod has a sealing disk located at its fastening lug, said sealing disk being surrounded in a sealing manner by one end of the elevated-heat resistant protective cover, wherein the protective cover has a cross-sectional profile that remains the same over its whole longitudinal extension, the sealing disk and the cylinder jacket of the spring element, which have the identically large outside diameters, being enclosed by the protective cover in a fluid-tight manner.

* * * * *